(12) United States Patent
Morris

(10) Patent No.: X8675
(45) Date of Patent: Mar. 6, 1835

(54) BRUSHED, FOR BLENDING COLORS, &C.

(76) Inventor: George W. Morris

George W. Morris. Philadelphia State of Pennsylvania —

The schedule referred to in these Letters Patent, and making part of the same; Containing a description in the words of the said George W. Morris himself, of his improvement in manufacturing Brushes for blending colours.

---

To all to whom these Presents shall come: —

Be it known that I, Geo. W. Morris of the City of Philadelphia, State of Pennsyl-vania, have discovered a new and useful improvement for making Brushes for blending colours, and that the following is a full and exact description thereof. —— The hair for making blending brushes that I have discovered answers so well for this purpose, is taken from the Ox or Cow or Cattle, also from the Horse, without distinction as to colour of the hair, but as the white hair makes the handsomest brushes, I have sent a sample of the white hair, and make the blending Brushes of the same —, it is obtained from those who prepare hair for upholsterers, they assort it from the stiffer sort of hair, and get a better price from the brush makers, it requires Comb-ing & is prepared for the brushes as we prepare hair Ordinarily by bleach-ing &c. I have described the hair in the simplest manner, so that none may misunderstand it, all of which is respectfully submitted by yours respectfully ——

Witnesses
B. T. Morris
H. W. Morris

Geo. W. Morris

Exd.
W.J.C.

(232 words)

Patented March 6th 1825.